Sept. 4, 1934.                L. EDELMANN                1,972,220
                              HYDROMETER FLOAT
                            Filed May 15, 1930
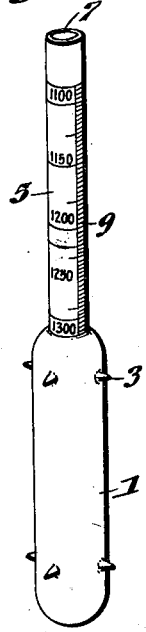
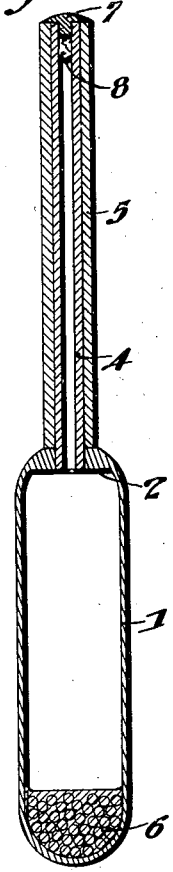
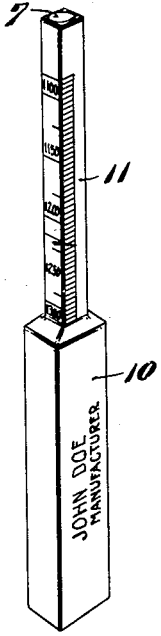
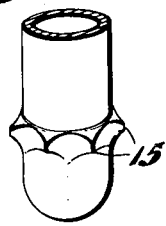
INVENTOR.
Leo Edelmann
BY
ATTORNEY.

Patented Sept. 4, 1934

1,972,220

UNITED STATES PATENT OFFICE 1,972,220

HYDROMETER FLOAT

Leo Edelmann, Chicago, Ill., assignor to E. Edelmann & Co., Chicago, Ill., a corporation of Illinois Application May 15, 1930, Serial No. 452,692

2 Claims. (Cl. 265—45)

My invention relates to improvements in hydrometer floats and particularly to a float intended and adapted for use in connection with a battery tester, freeze tester, or other like instrument.

An object of my invention is to provide a float gauge element of such form and construction that it can be produced of a phenolic condensation product or other readily molded and formed material less frangible than the ordinary glass float and better adapted to take and show graduating indications.

Another object is to so construct the float that ballast material can be readily and quickly inserted and the float can then be readily closed or sealed to be complete for use, without requiring the service of a glass blower or other skilled worker.

Still another object is to provide an instrument of this sort that can be more readily and accurately manufactured and can thus be more quickly calibrated and prepared for use.

With the above and other objects in view, which will be apparent to those skilled in the art, my invention includes certain novel features of construction and combinations of parts which will be hereinafter set forth in connection with the drawing and then pointed out in the claims.

In the drawing:

Figure 1 is a view in perspective showing a float element constructed in accordance with my invention.

Fig. 2 is an enlarged longitudinal sectional view.

Fig. 3 is a view similar to Fig. 1 showing a modified construction.

Figs. 4 and 5 are transverse sectional views through float bulb portions showing other possible modifications.

Fig. 6 is a fragmentary perspective view illustrating still another modification.

As hydrometer float elements are now constructed, it is customary to make the same from sections of glass tubing of different sizes welded together, and to shape up the parts as the process of manufacture progresses. This requires that wafer-thick glass tubing be used and that skilled glass workers be employed in the process of manufacture, and the uniformity of the finished glass bodies will depend much upon the exact character of the particular quantity of glass tubing and upon the particular work done. Further, where glass is used, it is customary to insert a paper or other printed scale strip within an open end of the gauge stem of the float, and then seal this end by fusion, removing any surplus length of the gauge stem. These operations necessarily cause variation in the action of the float elements as the two steps must be carried out following initial calibration and placement of ballast weight. The only way this can be overcome is by etching or otherwise marking the scale indications upon the exterior of the glass float stem, and this process of course presents commercial difficulties. With the above in mind, it is my purpose to provide a float element made of a phenolic condensation product or other like material that can be readily molded or otherwise formed to permit manufacture of commercial quantities of float structures within very narrow limits of variation as to the individual items, and to provide for ready placement of ballast weight within the float and subsequent closing of the same; and, also to provide for ready display of the independent scales, the name of the manufacturers, special directions, or any other matter that it may be desired to show upon or in connection with the float.

In the adaptation of my invention illustrated in Figs. 1 and 2 I have shown a float element of substantially usual form. The float portion 1 is molded or otherwise shaped and formed from a phenolic condensation product or other suitable or similar materials that will permit construction of this part of sufficient thinness to float and yet with sufficient strength to withstand the jars and shocks of use. This float portion might have one or more rows of spacing points 3 cast or otherwise formed thereon to project laterally in the usual manner, and at its upper end the float portion is open and is provided with a reinforcing shoulder 2.

A stem 4, made up of a metal tube or other suitable member, is cast into the shoulder 2 or is otherwise secured in place to extend axially at the upper end of the float portion 1, this tubular stem 4 having the opening therethrough of sufficient size for ready insertion of the ballast material.

A sleeve 5, of a phenolic condensation product or other similar or suitable material is fitted over the stem 4, and this sleeve 5 has the scale indications thereon.

In constructing my improved float element, the parts will be assembled as set forth above, and shot and wax, or other suitable ballast material is poured through the opening of stem 4 to collect in the lower end of the float portion 1, as indicated at 6. When the instrument has been properly calibrated, the open upper end of the passage can be closed by the use of solder or other material as indicated at 7. It may be found desirable to insert a small quantity of cotton waste or other material within the passage as shown at 8 prior to the application of the closing material to prevent the same from running through the passage in the stem. When the solder or other material is applied a slight portion of the same will extend beyond the top edge of the stem portion 4 and will serve to securely mount the sleeve 5 in place.

The float element thus constructed can have any desirable scale indications placed upon the stem thereof, as indicated at 9, and even upon the body portion, such indications to be etched, or stamped in, molded out, or otherwise applied or displayed, and likewise it will be appreciated that the name of the manufacturer, directions, and any other material or illustration might be applied to the float bulb portion.

With a float constructed in this manner it is possible to mold the body portions to keep the same much more accurately within size and weight limits so that it will be commercially practical to mold the scale indications upon the stem 5 in the initial forming operation; the desired amount of ballast can be readily inserted through the open end of the stem without necessity of exercising special care to prevent contact with inner walls of the stem or float portion, and the open end of the stem can then be closed without requiring the service of a specially skilled workman and without materially varying the weight of the instrument from the weight determined by insertion of ballast.

As shown in Fig. 3, the float portion 10 might be made substantially square in cross section so that longitudinal edges will be presented to lessen contact with the hydrometer barrel or other container in which the float is used, and the stem 11 might also be made of any desired polygonal form in cross-section to present flat sides on which scale markings could be shown.

In Fig. 4 I have illustrated the float portion 14 as triangular in cross section and with this form the edges would be presented to lessen contact with the hydrometer barrel or other container.

Fig. 5 illustrates another construction of the float portion to provide edges around the float portion to lessen frictional contact, which edges 15 might extend along substantially the entire length of the float portion or might be continued only over a short portion of the length as illustrated in Fig. 6.

From the foregoing it will be seen that I have provided a hydrometer float element of such form and construction that it can be readily cast, molded or otherwise formed from phenolic condensation products and other suitable like materials to give greater accuracy than is now possible by usual methods of forming hydrometer floats and which will not require the service of specially skilled artisans in assembling and completing the floats.

While I have herein shown and described only certain specific embodiments of my invention and have suggested only certain possible modifications, it will be appreciated that other changes and variations can be made in the form, construction, arrangement, and assembly of the parts without departing from the spirit and scope of my invention.

I claim:

1. A hydrometer float element comprising, a float portion of a moldable material, a tubular stem molded into said float portion to extend upwardly therefrom with its tubular passage opening into the float, a sleeve having gauge markings thereon mounted on said tubular stem, and plug means fitted in the open end of said tubular stem and having portions extended to engage with said sleeve to hold the sleeve against shifting and displacement.

2. A hydrometer float element comprising, a float portion of moldable material, such as phenolic condensation product closed at one end, a tubular stem of metallic material molded in said float portion opposite the closed end with the tubular passage thereof opening into the float, a gauge stem also of a moldable material such as phenolic condensation product provided with a passage to receive the metallic stem and having gauge markings on its outer surface, and a plug having a portion insertable in the outer end of the tubular stem to close the same and provided with a headed portion engaging the outer end of the gauge stem to hold the same against endwise shifting and displacement.

LEO EDELMANN.